INVENTOR
JAMES W. ELLIOTT
BY
Hopgood & Calimafde
ATTORNEYS

| NO. OF INPUT PULSES | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| OUTPUT OF FLIP-FLOPS | A | 0 | 1 | 0 | 1 | 0 | 1 | 0 | 1 | 0 | 1 | 0 | 1 | 0 | 1 | 0 | 1 |
| | B | 0 | 0 | 0 | 0 | 0 | 0 | 0 | 0 | 0 | 0 | 0 | 0 | 0 | 0 | 0 | 0 |
| | C | 0 | 0 | 1 | 0 | 0 | 0 | 1 | 0 | 0 | 0 | 1 | 0 | 0 | 0 | 1 | 0 |
| | D | 0 | 0 | 0 | 1 | 0 | 1 | 0 | 0 | 0 | 0 | 0 | 1 | 0 | 1 | 0 | 0 |
| | E | 0 | 0 | 0 | 0 | 1 | 1 | 0 | 1 | 0 | 1 | 0 | 1 | 1 | 0 | 0 | 0 |
| | F | 0 | 0 | 0 | 0 | 0 | 0 | 1 | 1 | 0 | 0 | 1 | 1 | 0 | 1 | 0 | 1 |
| | G | 0 | 0 | 0 | 0 | 0 | 0 | 0 | 0 | 1 | 1 | 1 | 1 | 0 | 0 | 1 | 1 |
| | H | 0 | 0 | 0 | 0 | 0 | 0 | 0 | 0 | 0 | 0 | 0 | 0 | 1 | 1 | 1 | 1 |
| COUNT | | 0 | 1 | 4 | 9 | 16 | 25 | 36 | 49 | 64 | 81 | 100 | 121 | 144 | 169 | 196 | 225 |

INVENTOR
JAMES W. ELLIOTT
BY
Hopgood & Calimafde
ATTORNEYS

A SIGNIFIES Q OUTPUT OF FLIP-FLOP "A"
Ā SIGNIFIES Q̄ OUTPUT OF FLIP-FLOP "A"

INVENTOR
JAMES W. ELLIOTT
BY
Hopgood & Calimafde
ATTORNEYS

United States Patent Office 3,555,436
Patented Jan. 12, 1971

3,555,436
ANALOG-TO-DIGITAL CONVERTER WITH PROGRAMMED CHARACTERIZING FUNCTION

James W. Elliott, St. Petersburg, Fla., assignor to Electronic Communications, Inc., a corporation of New Jersey Filed Mar. 15, 1968, Ser. No. 713,484
Int. Cl. G08c *9/00;* G06g *7/20*
U.S. Cl. 328—144 7 Claims

ABSTRACT OF THE DISCLOSURE

The invention contemplates a method and apparatus for achieving a digitalized and quantized root function of an input analog voltage, with techniques that involve no dependence on analog components for the root-taking function. The basic accuracy of the invention depends upon clock-timing of a computer, the characterizing function of which is related to time and appears across an output-summing network. This output voltage, in comparison with the given input analog voltage, is utilized to operate a gate, in such manner that the number of gated clock pulses is the quantized root function of the input analog voltage. The process may be automatically recycled to present current display or availability of the circuit's operation on the instantaneous magnitude of the input analog voltage.

This invention relates to an analog-to-digital converter incorporating a special characterizing function in the conversion process.

It is an object of the invention to provide an improved device of the character indicated.

Another object is to provide an improved circuit for converting an analog voltage to a digitalized root function thereof.

It is a further object to meet the above objects with a circuit which additionally quantizes the input analog voltage, in the process of performing the root function.

A specific object is to provide an improved analog-to-digital converter circuit, wherein square-root and quantizing functions are performed simultaneously, and wherein there is no dependence upon an analog nonlinear circuit element for square-root characteristics.

A general object is to meet the foregoing objects with an arrangement in which most of the circuitry can be easily integrated and wherein accuracy does not vary with temperature changes.

Other objects and various further features of novelty and invention will be pointed out or will occur to those skilled in the art from a reading of the following specification in conjunction with the accompanying drawings. In said drawings, which show, for illustrative purposes only, a preferred form of the invention:

Briefly stated, the invention contemplates a method and apparatus for achieving a digitalized and quantized root function of an input analog voltage, with techniques that involve no dependence on analog components for the root-taking function. The basic accuracy of the invention depends upon clock-timing of a computer, the characterizing function of which is related to time and appears across an output-summing network. This output voltage, in comparison with the given input analog voltage, is utilized to operate a gate, in such manner that the number of gated clock pulses is the quantized root function of the input analog voltage. The process may be automatically recycled to present current display or availability of the circuit's operation on the instantaneous magnitude of the input analog voltage.

Figure 1:
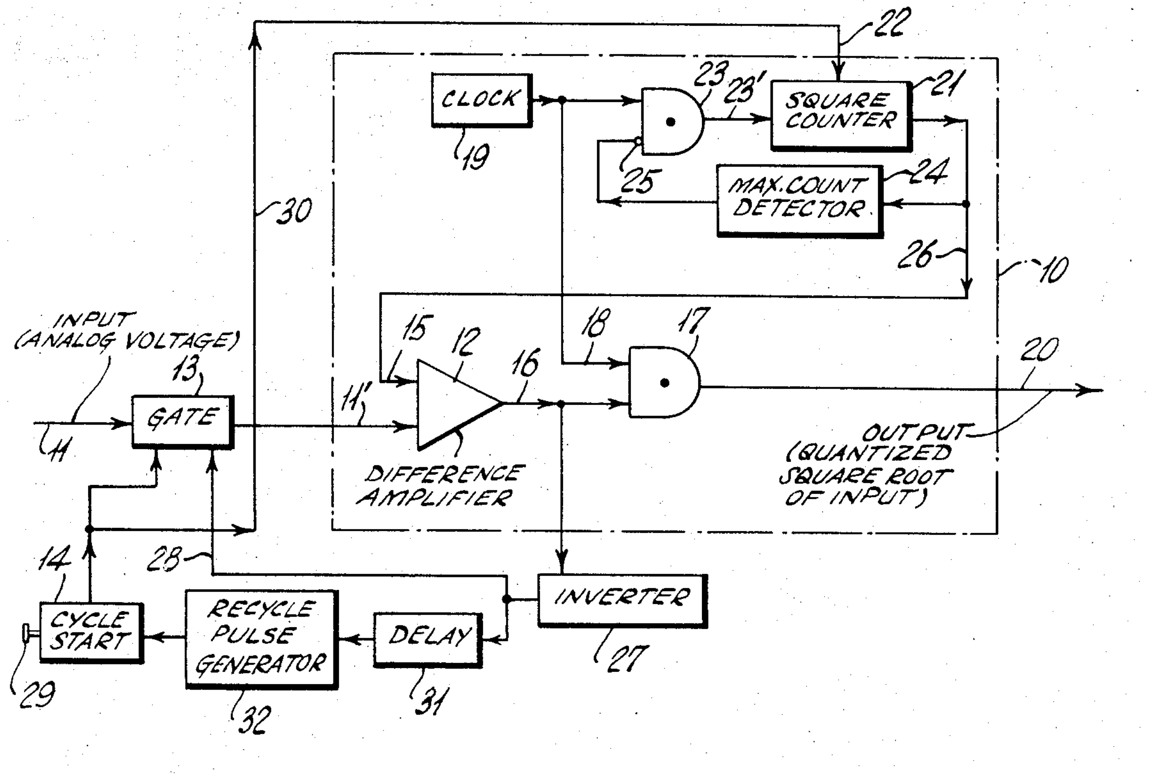
FIG. 1 is an electrical block diagram schematically showing components of a square-root and quantizing circuit of the invention.
Figures 2, 4:
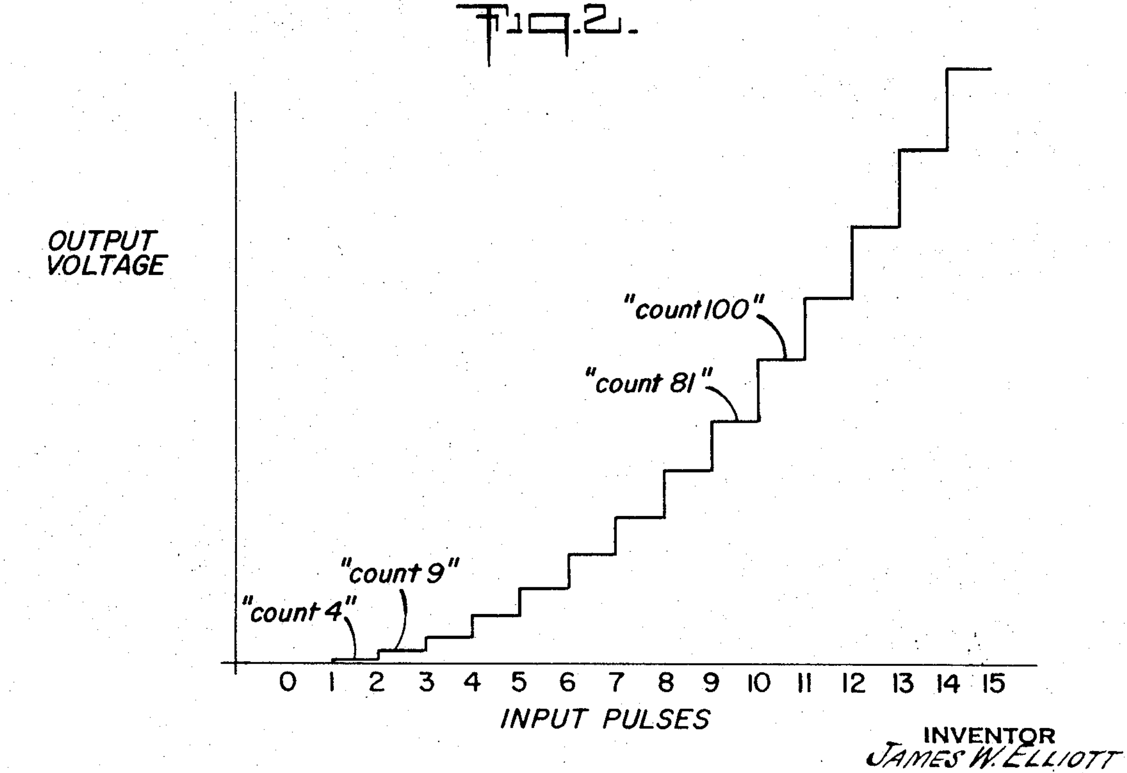
FIG. 2 is a graph depicting output of the square counter in FIG. 1, as a function of clock-pulse input.
FIG. 4 is a table depicting flip-flop operation within the circuit of FIG. 3.

Referring to FIGS. 1 and 2 of the drawings, the invention is shown in application to a digital square-root and quantizing circuit 10 operative upon an input analog voltage available in line 11, for application at 11' to a first input connection to a difference amplifier 12. A gate 13 in the input line 11 is opened by cycle-start means 14, to determine the commencement of input analog-voltage application to amplifier 12. The instantaneous magnitude of voltage in line 11 establishes a threshold for operation of amplifier 12; as long as this threshold exceeds the voltage magnitude presented at a second amplifier-input connection 15, the output of amplifier 12 is operative via line 16 to open a gate 17, shown as an AND gate. Gate 17 is continuously supplied, at its second input 18, by clock pulses from a clock-pulse generator or source 19. Thus, as long as gate 17 is held open, the output 20 of the circuit will be a train of clock pulses.

According to the invention, the number of clock pulses in each such train, at 20, is a quantized root function of the instantaneous magnitude of the input analog voltage at 11, and in the form shown, this is a square-root function, achieved at a counter 21 connected by an output line 26 to the difference-amplifier input 15. The square counter will be described later in greater detail in connection with FIG. 3. Briefly, however, the counter 21 incorporates reset means 22 and accepts input clock pulses from generator 19 via AND gate 23. A maximum-count detector 24 is depicted in a feed-back line from the output of counter 21 to an inverting connection 25 to the gate 23, the function being to close gate 23 upon achievement of the count limit at 21.

As indicated generally above, the count developed at counter 21 appears as the voltage output of a summing network (to be described). FIG. 2 displays the pattern of development of such voltage, as it appears in output line 26, for each recycling of the counter 21. This is seen to be a cycle of stepped voltage change, in increments timed by successive clock pulses, the increments being nonlinearly related in order to achieve the desired overall characterizing function, which in the case shown involves a square-law relation between developing voltage and number of input pulses.

When the output voltage of the square counter 21 first exceeds the magnitude of the analog voltage input at 11', amplifier 12 is cut off, thus closing the gate 17 and terminating the train of clock pulses at 20. It will be understood that the number of pulses in the train can be displayed or otherwise utilized, as dictated by particular application requirements, all served by direct connection to the output line 20.

To complete a description of a timed cycle, an inverter 27 is shown responding to the output of difference amplifier 12, whereby the end of a particular count function is signaled. This signal is shown, by connection 28, to close the input gate 13 and thus to recondition the system for the start of another analog-voltage conversion.

The cycle-start means 14 is schematically shown with a manual-start button or other intermittently operated means 29, and each cycle start will be understood not only to reopen the gate 13 but also (via line 30) to reset the square counter. If automatic recycling is desired, as when tracking a varying input analog voltage magnitude, I show provision of a delay (at 31) prior to generating (at 32) a suitable pulse for recycling the start means 14.

The counter means will now be described in further detail, in connection with FIGS. 3 and 4. Briefly, the square counter is realized by gating out the counts "1," "4," "9," "16" . . . $n^2$ and then using them to steer an array of counter flip-flops to the next squared state. For example, in any given count cycle, the "count 4" is used, upon occurrence of the third clock pulse, to enable the counter to jump to "count 9"; and the "count 81" is used, upon occurrence of the tenth clock pulse, to enable the counter to jump to "count 100." These particular events are identified by legend, for illustration, in FIG. 2.

For the form shown, the square counter has a capacity of eight binary digits, identified in the table of FIG. 4 by the capital-letter designations A, B . . . H, which represent flip-flop locations in the circuit of FIG. 3. This enables counting squares up to 15, namely, the decimal count of 225. FIG. 4 tabulates the condition of the respective digit-position flip-flops to achieve the desired steering by decimal squares, for each successive clock pulse. Thus, to take the illustrative occurrence of the tenth clock pulse, the counter will have been steered to "count 81," meaning an output voltage in line 26 characterized by a magnitude proportiond to 81, determined by states 1–0–0–0–1–0–1–0 for flip-flops A, B . . . H, respectively. The action of the tenth pulse is to steer the counter to "count 100," the next decimal square, in which the pattern of flip-flop states becomes 0–0–1–0–0–1–1–0, respectively, for an output voltage (in line 26) proportioned to 100.

Figure 3:
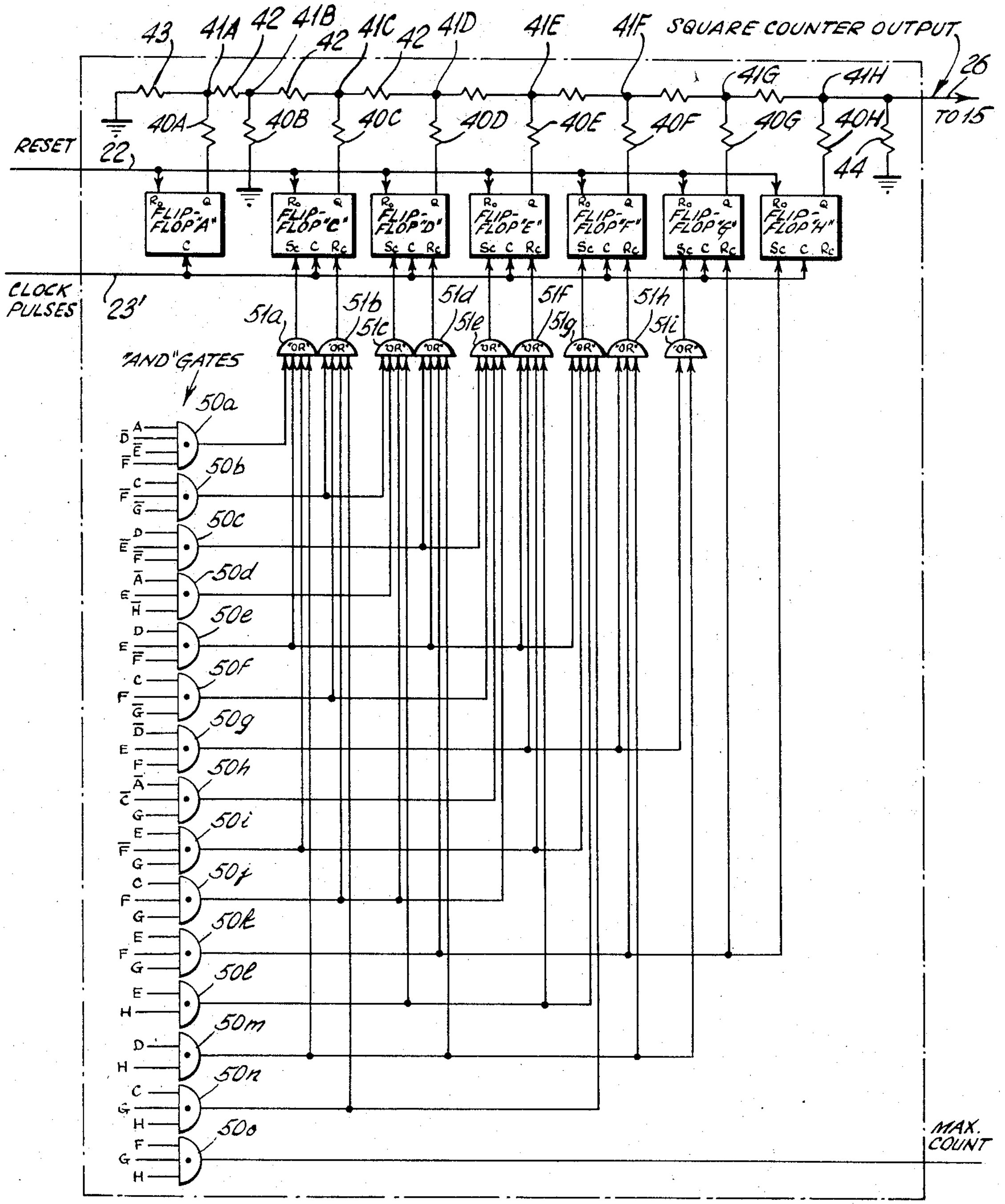
FIG. 3 is a diagram schematically depicting logic circuitry of the square counter in FIG. 1.

In FIG. 3, the individual flip-flops A . . . H will be seen to comprise an array of circuits which may be duplicate integrated circuits. For the case of the "B" digit position, and for the square-root function here involved, FIG. 4 shows no change of state required throughout the full counting cycle; thus, an economy can be realized by omitting the flip-flop for the "B"-digit, as shown by the resistance-grounded connection 40B.

Each flip-flop is a bistable device, with an output designated Q, which, for the common excitation shown for all flip-flops, will either be 0 volt, or a single voltage, such as 6 volts, depending upon whether the particular flip-flop is in its active or its inactive state. The summing network is shown as plural like resistive flip-flop connections 40A . . . 40H to spaced taps 41A . . . 41H along an array of like summing resistors 42, the latter being each one-half the resistance of the individual flip-flop output resistors 40A . . . 40H. To provide binary-dividing continuity in the summing network, grounded resistors 43–44 are shown at the respective ends, in parallel with output resistors 40A and 40H, and their associated flip-flops A and H, respectively.

All flip-flops are shown with synchronizing input connections, designated C, and served by the clock-pulse supply line 23′ from the AND circuit 23. The "A" flip-flop, for the "A" or first binary-digit position, must be caused to change its state with each successive clock pulse; therefore, only the single input connection C, is shown for flip-flop "A." All other flip-flops ("C," "D" . . . "H") are to be operated only occasionally, and in accordance with the program of succession tabulated in FIG. 4. Thus, for these other flip-flops, additional provision is shown, at $S_c$ and $R_c$, for enabling and disabling, respectively, each flip-flop's synchronized response to a particular clock pulse. In the form shown in FIG. 3, a network of AND gates 50$a$, 50$b$ . . . 50$o$, and OR gates 51$a$, 51$b$ . . . 51$i$, responds to the instantaneous pattern of states of flip-flops "A" . . . "H" to determine the pattern of states needed upon occurrence of the next successive clock pulse. The selection is made operative at the clock-enabling ($S_c$) connections for the flip-flops involved, and the pattern of previous connections is cancelled by similarly programmed reset pulses for the $R_c$ connections for the flip-flops just previously involved.

It will be appreciated that symbolic circuit connections are necessary for simplified description of FIG. 3. The symbolism is employed to designate the operative inputs for the respective AND gates 50$a$, 50$b$ . . . 50$o$. Thus, the AND gate 50$a$ requires for its operation the concurrent recognition of four conditions, viz: (1) the Q output of flip-flop "A," meaning that, for the periods when flip-flop "A" is supplying a voltage output (Q), the "A" input to gate 50$a$ is operative (2) the $\overline{Q}$ (inverted Q) output of flip-flop "D," meaning that, for the periods when flip-flop "D" is at zero volts, the "$\overline{D}$" input to gate 50$a$ is operative; (3) the $\overline{Q}$ output of flip-flop "E," designated $\overline{E}$ at the input gate 50$a$; and (4) the $\overline{Q}$ output of flip-flop "F," designated $\overline{F}$. This pattern of concurrent input states governing gate 50$a$ is seen to conform to the digit-position pattern 1–0–0–0 which from FIG. 1 is recognized as determining the "count 1" (or first square) condition; this will have been reflected in application of 6 volts at the Q output of flip-flop "A," to provide the first (and smallest) voltage step in output-function development (see FIG. 2). Through operation of AND gate 50$a$, and OR gate 51$a$, this condition is seen to actuate the clock-enabling connection $S_c$ for flip-flop "C," so that the next clock pulse will "steer" the counter to conform to the binary-digit pattern 0–0–1–0; in FIG. 4, this determines the "count 4" output, meaning that the summing network now develops the "count 4" step shown in FIG. 2.

Similar analysis can be made for all count steps, with successive clock pulses, based on the symbolism displayed at gate inputs 50$a$ . . . 50$o$ in FIG. 3. Also, the patterns of flip-flop disabling (at $R_c$ for each flip-flop) is similarly described by the legends in FIG. 3, so that steering for the desired square-function necessarily follows a rigorously programmed pattern, for each count cycle.

For example, the next step after "count 4" requires that flip-flop "C" be deactivated; the events that determine this are observed for coincidence at the AND gate 50$b$, viz: the "C" flip-flop active, and flip-flops "F" and "G" inactive (denoted C, $\overline{F}$, $\overline{G}$ in FIG. 3, at gate 50$b$). This situation, namely, for operation of gate 50$b$, is seen to deactivate flip-flop "C" via the OR gate 51$b$, and to activate (enable) flip-flop "D." The third (next) clock pulse will then be operative to automatically disable flip-flop "C" and to activate flip-flop "D," producing single 6-volt outputs to the summing network at 40A and 40D, and thus switching to the "count 9" step (FIG. 2). To have produced this step the binary digit pattern will be 1–0–0–1 for the first four flip-flop positions A–B–C–D.

It will be seen that I have described a basically simple analog-to-digital converter in which the desired characterizing function is achieved with accuracy determined by clock pulses. Such accuracy is neither dependent upon temperature variation nor upon performance of analog circuit elements. The quantizing function is directly operative at the input difference amplifier 12, and beyond this point the input analog voltage loses its analog identity. The basic simplicity lends itself to miniaturized fabrication, with integrated circuits.

Although the invention has been described in detail for the preferred form shown, it will be understood that modifications may be made without departing from the scope of the invention as defined in the claims which follow.

I claim:

1. A computing analog-to-digital converter, comprising threshold-responsive voltage-comparator means having a first input adapted to accept an analog voltage to establish a threshold, and having a second input adapted to accept a voltage to be compared with the analog voltage, gating means so connected to the output of said threshold means as to establish an "open" condition to the gate output as long as the second input voltage does not achieve the threshold attributable to the analog voltage, a clock-pulse generator connected to said gating means and providing a train of clock pulses to the gate output as long as the second input voltage does not achieve said threshold, a digitalized nonlinear computer connected to said clock generator and including means for producing a signal having a predetermined nonlinear relationship to the instantaneous count of the clock pulses, a voltage summing output network for producing an output voltage corresponding to said signal, and means for coupling the output of said network to the second input of said voltage-comparator means, whereby said comparator will be operative to close said gating means and thus terminate the supply of clock pulses to the output thereof upon achievement of that nonlinearly counted summed network output voltage which first equals or exceeds the threshold set by said input analog voltage.

2. The converter of claim 1, in which said computer further comprises means for sensing when said signal producing means has reached a maximum level, and means responsive to said sensing means for thereafter inhibiting the application of clock pulses to said signal producing means.

3. The converter of claim 1, in which said signal producing means comprises means for producing a binary signal corresponding to the square of the clock-pulse count.

4. The converter of claim 1, in which said nonlinear computer includes a digitalized square-function counter.

5. The converter of claim 4, in which said counter has an instantaneous binary state equal to the square of the number of input pulses from said clock-pulse generator.

6. The converter of claim 1, in which said counter comprises an array of bistable flip-flops with clock-synchronized control connections, and a programmed array of steering gates responsive to the instantaneous states of said flip-flops, the flip-flops corresponding to desired binary-digit positions.

7. The converter of claim 6, in which the summing network is of binary dividing character, with individual flip-flop outputs connected to uniformly resistively spaced taps through resistances of twice the magnitude of the inter-tap resistance.

References Cited

UNITED STATES PATENTS

| | | | |
|---|---|---|---|
| 3,167,757 | 1/1965 | D'Aquila | 307—235 |
| 3,177,350 | 4/1965 | Abbott | 307—229 |
| 3,381,142 | 4/1968 | Cook | 307—235 |

DONALD D. FORRER, Primary Examiner

H. A. DIXON, Assistant Examiner

U.S. Cl. X.R.

307—229; 340—347